United States Patent Office 2,741,902
Patented Apr. 17, 1956

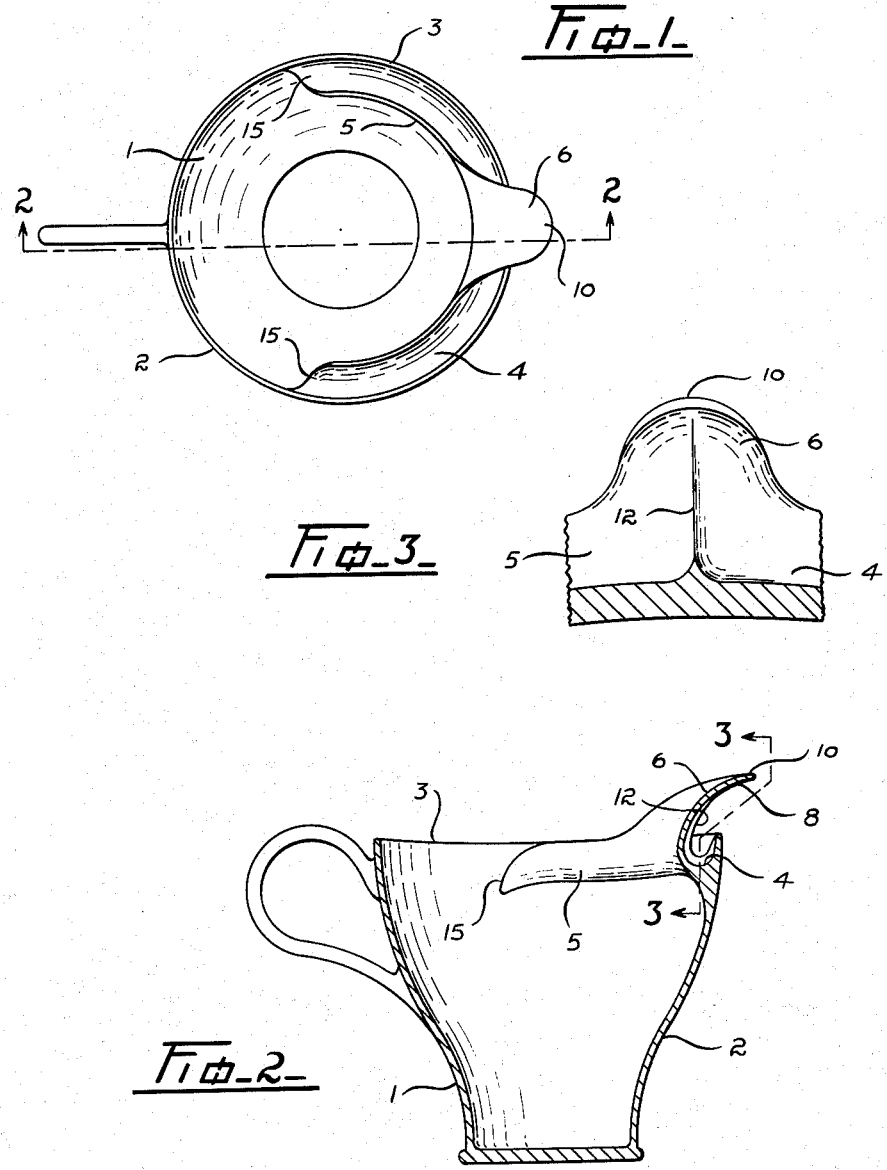

2,741,902

POURING SPOUTS FOR CREAM JUGS AND THE LIKE

James I. Thompson, Vancouver, British Columbia, Canada, assignor of one-half to Douglas I. Cooper, Vancouver, British Columbia, Canada Application March 23, 1953, Serial No. 344,091

1 Claim. (Cl. 65—31)

My invention relates to improvements in pouring spouts.

The object of the invention is to provide a pouring spout for a jug or other vessel which will prevent the drip which flows down the outer surface of the spout, when the vessel is set down after pouring, from reaching the lower edge of the vessel. Such a device is particularly useful for cream jugs and any other vessel used for intermittently pouring cream or other viscous or rapidly coagulating fluids.

Many devices have been designed with the above object in mind, but hitherto where a channel is provided below the pouring spout to return the drip to the vessel, especially where cream is the fluid decanted, a drip globule will by virtue of its viscosity and surface tension adhere to the spout or build up in the channel and spill therefrom when the jug is again tilted to pour.

In the present device means are provided for ensuring that the drip will be divided and so dispersed that the tendency for building up is definitely overcome and the jug remains clean during its period of service.

Referring to the accompanying drawings:

Figure 1 is a plan view of a cream jug showing its pouring spout.

Figure 2 is a vertical sectional view taken on the line 2—2 of Figure 1.

Figure 3 is an enlarged sectional view taken on the line 3—3 of Figure 2.

In the drawings like characters of reference indicate corresponding parts in each figure.

The numeral 1 indicates generally a cream jug having a body portion 2 surmounted by an unbroken rim 3, the front portion of which forms the outer wall of a channel 4 and is substantially vertical. The channel 4 is provided with an inner wall 5 which extends upwardly and forwardly at the front of the jug to form a pouring spout 6. The pouring spout is forwardly curved as at 8 to project slightly beyond the front of the rim 3, but remains slightly inclined above the horizontal at its tip or lip as at 10 so as to cause any spot of fluid which has reached the extreme tip of the spout but is still on its outer surface to flow back therefrom towards the channel 4.

A ridge 12 which is substantially triangular in cross section as shown in Figure 3, extends radially across the base of the channel 4 and upwards into close proximity with the underside of the tip 10 of the spout 6. The cross section of the ridge diminishes gradually as it extends upwardly and is flared into the underside of the tip of the spout.

When say cream or other fluid having similar properties is being poured from the jug, it flows in the usual way falling freely from the tip 10 of the pouring spout, but as soon as the jug 1 is set down on the table a very small quantity of fluid will be in contact with the edge of the lip which must necessarily flow downwardly on the outer side of the pouring spout. It is this small quantity which in the case of the conventional spout congeals and remains on the spout, or runs down the front of the jug. Likewise with each succeeding pour from the jug a greater area of cream will develop at its point and sufficient cream is delivered below the extreme tip of the spout that some must necessarily flow downwards therefrom.

With a jug made according to the invention the smallest quantity or droplet of fluid flowing downwardly on the outer surface of the spout will move to engage the upper extremity of the ridge 12. The ridge being knife edged will divide any quantity of liquid which moves down it more quickly than a rounded edge would do and consequently cream which might otherwise coagulate and build up at the apex of the channel will move across the one or both sides of the triangular ridge before accumulating in one or both slopes of the channel. Since it is with my improvement possible to prevent accumulation and coagulation of liquid at the apex of the channel it is impossible in normal use to so choke any part of the channel that dripping of spots from the jug can occur.

What I claim as my invention is:

A pouring spout for a jug having a channel extending around the front of the jug and on both sides of the spout and terminally communicating with the interior of the jug, said spout extending outwardly beyond the outer edge of the channel, a substantially triangular ridge having a knife-like edge extending from the tip of the spout downwardly along the front face of said spout across the channel and upwardly to the upper edge of said channel as a continuous member, said ridge increasing in depth from the tip of the spout to the channel and being of lesser depth than the channel at its point of crossing of said channel.

References Cited in the file of this patent

UNITED STATES PATENTS

| 1,529,360 | Johnson | Mar. 10, 1925 |
| 2,035,877 | Geerlings | Mar. 31, 1936 |
| 2,241,840 | Achtziger | May 13, 1941 |
| 2,601,040 | Livingstone | June 17, 1952 |